United States Patent
Gurunathan (10) Patent No.: US 10,896,453 B2
(45) Date of Patent: Jan. 19, 2021

(54) SYSTEM AND METHOD FOR MANAGING EVENTS

(71) Applicant: MASTERCARD INTERNATIONAL INCORPORATED, Purchase, NY (US)

(72) Inventor: Arunmurthy Gurunathan, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 336 days.

(21) Appl. No.: 15/584,093

(22) Filed: May 2, 2017

(65) Prior Publication Data
US 2017/0323360 A1  Nov. 9, 2017

(30) Foreign Application Priority Data

May 6, 2016  (SG) .......................... 10201603602 U (51) Int. Cl.
*G06Q 30/00* (2012.01)
*G06Q 30/06* (2012.01)
(52) U.S. Cl.
CPC ..... *G06Q 30/0611* (2013.01); *G06Q 30/0627* (2013.01)
(58) Field of Classification Search
CPC ........................................ G06Q 30/0601–0645
See application file for complete search history.

(56) References Cited

U.S. PATENT DOCUMENTS 5,948,040 A * 9/1999 DeLorme
8,943,044 B1 * 1/2015 Saylor .................... G06Q 50/01
707/722
9,552,599 B1 * 1/2017 Alag
2005/0203783 A1 * 9/2005 Allen .................... G06Q 10/02
705/5
2009/0112727 A1 * 4/2009 Chi
(Continued)

FOREIGN PATENT DOCUMENTS

WO  WO 2016103136 A1 * 12/2014

OTHER PUBLICATIONS

"Survey Monkey,"Does each responded get assigned response ID?"", Mar. 26, 2016, web.archive.org, p. 1" (Year: 2016).*

*Primary Examiner* — William J Allen
*Assistant Examiner* — Maria S. P. Heath
(74) *Attorney, Agent, or Firm* — Budzyn IP Law, LLC (57) ABSTRACT

In one aspect, a method is provided for managing events which includes receiving a host request, through a host access terminal, the host request comprising one or more event constraints that at least partially define an event. The method also includes searching a database of service proposals to locate at least one service proposal complying with one or more of the event constraints; transmitting the at least one service proposal to the host access terminal; receiving at least one service proposal acceptance from the host terminal; and receiving client access details of one or more clients. Once client access details are received, a token is generated for each client, the token being for accessing one or more accepted service proposals and an event request is transmitted to each of the one or more client terminals, each event request comprising the requisite token.

18 Claims, 6 Drawing Sheets

(56) References Cited

U.S. PATENT DOCUMENTS

2014/0278676 A1* 9/2014 Burka ................ G06Q 10/1093
  705/7.19
2015/0154516 A1* 6/2015 Joachim
2016/0275581 A1* 9/2016 Weston .............. G06Q 30/0611

* cited by examiner

SYSTEM AND METHOD FOR MANAGING EVENTS

TECHNICAL FIELD

The present invention relates to a system and method for managing events. The present invention has application in, but is not limited to, event creation, attendee management and coordination, and transaction processing.

BACKGROUND

The Internet has provided merchants, suppliers and service providers an unprecedented opportunity to research and advertise their goods and services. The result is that there can be confusion for parties searching for those advertisements to understand whether they have located the best, or most affordable goods and services in respect of which they are searching.

This issue is exacerbated when people seek service providers in areas with which they are unfamiliar. For example, it can be difficult for a person to know if they are booking accommodation that is conveniently located for the activities they intend to undertake in a particular location, whether particular services, such as taxi services, are as reliable in that particular location or whether there are alternatives they should consider.

Moreover, searching for this information for multiple attendees with potentially disparate budgets and other requirements (e.g. family friendly hotels versus hostels) can be an onerous task.

SUMMARY

The present invention provides a method for managing events, comprising:
  receiving a host request through a host access terminal, the host request comprising one or more event constraints that at least partially define an event;
  searching a database of service proposals to locate at least one service proposal complying with one or more of the event constraints;
  transmitting the at least one service proposal to the host access terminal;
  receiving at least one service proposal acceptance from the host terminal, each service proposal acceptance being acceptance of a respective one of the at least one service proposal;
  receiving client access details of one or more clients, the client access details designating a means for sending communications from the server to a respective one or more client terminals;
  generating a token for each client, the token being for accessing one or more accepted service proposals; and
  transmitting an event request to each of the one or more client terminals, each event request comprising the token.

The present invention further provides a computer system for managing events, the computer system comprising:
  a memory device for storing data;
  a display; and
  a processor coupled to the memory device and being configured to:
    receive a host request through a host access terminal, the host request comprising one or more event constraints that at least partially define an event;
    search a database of service proposals to locate at least one service proposal complying with one or more of the event constraints;
    transmit the at least one service proposal to the host access terminal;
    receive at least one service proposal acceptance from the host terminal, each service proposal acceptance being acceptance of a respective one of the at least one service proposal;
    receive client access details of one or more clients, the client access details designating a means for sending communications from the server to a respective one or more client terminals;
    generate a token for each client, the token being for accessing one or more accepted service proposals; and
    transmit an event request to each of the one or more client terminals, each event request comprising the token

BRIEF DESCRIPTION OF THE DRAWINGS

Some embodiments of the invention will now be described by way of non-limiting example only and with reference to the accompanying drawings in which.

DETAILED DESCRIPTION

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "retrieving", "filtering", "providing", "displaying", "analysing", "enabling", "disabling" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Figure 1:
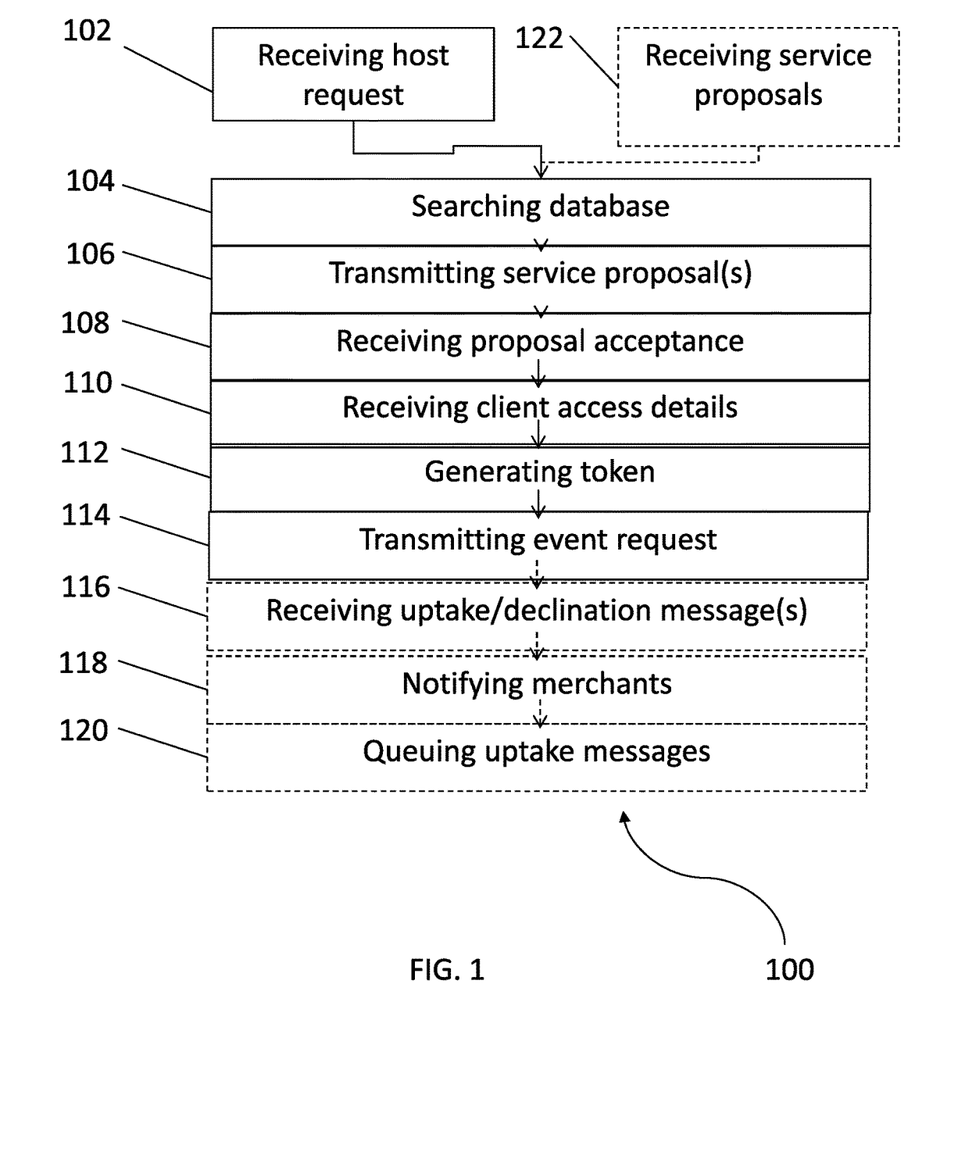
FIG. 1 is a flow diagram of a method for managing events in accordance with present teachings.

FIG. 1 shows a method 100 for managing events in accordance with one embodiment of the invention. The method broadly includes the steps of:

Step 102: receiving a host request
Step 104: searching a database of service proposals
Step 106: transmitting services proposal(s) located by step 104
Step 108: receiving acceptance of service proposal(s)
Step 110: receiving client access details
Step 112: generating a token
Step 114: transmitting event request(s)

A host request is a request to create an event using the system described herein. The requester is typically the host of the event or a representative of the host. The events are thus any form of gathering of people, particularly where such a gathering requires funding—for example, for the venue, food, beverages, accommodation, travel and so forth.

The host request is sent through a host access terminal, to be received by a server (step 102). The host access terminal may be any electronic device, such as a smartphone, laptop, tablet computer, personal computer or other digital assistant.

The host request may be generated by various methods. In one embodiment, the host request is generated by text searching an email or other document, to identify the necessary constraints for creating an event. The host request may also be guided using an online form for capturing specific details used to define the event.

Regardless of the manner in which the host request is generated, the host request necessarily includes one or more event constraints that at least partially define the event. The event constraints will typically include a date for the event and a number of invitees. Event constraints may also include a budget for the event, the desired location for the event and the type of event. The budget may be an overall budget including expected contributions from attendees of invitees, but may instead be an amount the host is willing to pay towards the event. The type of event may be, for example, a ball, sporting event, black tie event, casual event or professional seminar. The constraints thus 'define' the event insofar as they describe parameters used to create and coordinate the event. The abovementioned constraints may form a group of constraints, or part of a group of constraints, that are individually selectable when defining the event.

The location or venue at which the event is hosted may be predetermined. Alternatively, the host may specify a location and allow the server to generate recommendations for venues, the recommendations being provided in the form of service proposals discussed with reference to step 104.

Wherever a location or venue is specified herein, as context permits that term may refer to a geographical region, a city or town, a specific location with or without a location tolerance radius, and a particular building or venue. The location tolerance radius relates to the hosts desired location, and is a distance the host is willing to move from their desired location. If, for example, a venue or accommodation falls within the location tolerance radius then service proposals relating to that venue or accommodation may be presented to the host for review after step 106. Where a venue or accommodation falls outside the location tolerance radius, it will be filtered out of the results when a search for suitable service proposals is performed at step 104. Thus the service proposals may be filtered according to whether they are for services available of the desired location.

After receiving the host request, accompanied by the event constraint or constraints, the server searches a database of service proposals to locate service proposals complying with one or more of the event constraints (step 104). A service proposal is an offer by a merchant—for example a venue manager, catering service provider or cleaning service—to provide their services. Each service proposal may comprise constraints such as a minimum number of invitees or attendees—for example for catering purposes—a price of the services which may be an overall price or a price per invitee or attendee, dates at which the service will be available and venues at which the service can be provided.

The service proposals are then matched according to their compliance with the constraints. If an event is anticipated to draw 100 people, then service offerings with a minimum number of attendees of 100 or fewer, and/or with a maximum number of attendees of 100 or greater, may be accepted and other service proposals requiring other numbers of attendees may be disregarded or filtered out of the results. Service proposals may be similarly filtered in or out depending on each of the other constraints. Where no service proposals are found that comply with a particular constraint, a 'best fit' may be used. For example, where no venue is able to host an event with only 7 people, service proposals from venues that can host events down to 8 people may be presented to the host for review.

Once the service proposals have been filtered, the service proposal or proposals that comply with the constraints— within any tolerance or adjustment—are transmitted to the host access terminal (step 106). This transmission may be in the form of an email containing attachments for each service proposal, a link for each service proposal or a link to a personal webpage on which the relevant details can be viewed, a text message or any other suitable mechanism for conveying the service proposals to the host terminal.

The host then views the service proposals on the host terminal and determines which, if any, of the service proposals are acceptable. The host accepts or declines the service proposal or proposals, for example by selecting an accept or decline button presented in the email, by sending an email containing a list of items each representing an accepted service proposal or any other appropriate method.

The server receives the service proposal acceptance, or acceptances, from the host terminal on which acceptance of the respective proposal was given (step 108). Each service proposal acceptance is an acceptance of a respective one of the service proposal or proposals sent by the server to the host terminal. Similar to the transmission of service proposals by the server to the host terminal, acceptances can take any appropriate form, such as an email, text message or a message posted on social media.

The server now knows which service proposals have been accepted and is therefore in a position to communicate details of the event to third parties such as clients (i.e. attendees or invitees). In order to convey details of the event to clients the server receives client access details for each client. The client access details designate a means for sending communications from the server to a respective one or more client terminals. Similar to a host terminal, a client terminal may be any appropriate device such as a smartphone, laptop computer or tablet.

The server may receive the client access details (step 110) in any appropriate format, such as an email list or spreadsheet.

The server generates a code or 'access token' for each client to access one or more of the service proposals in respect of which an acceptance was received at the server—i.e. 'accepted service proposals' (step 112). The access token enables the server to match communications from client terminals with respective service proposals. The access token may act as the server's reference for a particular client, or may act as a reference for a particular service proposal (e.g. where the access token is unique to a service proposal), or both (e.g. where the access token is unique to the client).

After generating access tokens, an invitation or 'event request' is transmitted to each client terminal (step 114). The event request comprises an invitation to attend the event. The event request also comprises the access token so that the client can view accepted service proposals (i.e. those accepted by the host). The access token may comprise a link unique to a particular client or may be a generic link accessible to all clients. The access token may also comprise metadata by which the server can recognise the particular client and thereby link any communications from the client with the accepted service proposals provided to them.

Notably, not all clients may be provided the same accepted service proposals. In some cases, important attendees (e.g. presenters in cases where the event is a seminar) may receive an event request comprising a first set of accepted service proposals, and other attendees (e.g. the audience at the seminar) may receive a second set of accepted service proposals that differs from the first set.

Upon receipt of the event request by the client terminal, the client reviews the accepted services proposals supplied with the event request. The client may elect not to attend, in which case the client terminal is used to send an event declination message to the server. The server then reduces the number of attendees by one or, where the client comprises a group, by the number of the group.

Once the number of attendees changes, whether the number of attendees increases or decreases, the server may search the database of service proposals to locate further service proposals that are suited to the new number of attendees. The server may also send an email or message to the host terminal advising that the number of attendees has:
  dropped below the threshold required for a particular accepted service proposal
  exceeded the maximum number of attendees for a particular service proposal, or
  moved the event to a higher cost per attendee (generally where the number of attendees decreases) or lower cost per attendee (generally where the number of attendees increases).

If a client elects to attend and take advantage of the accepted service proposal or proposals accompanying their event request, or a subset of the accepted service proposals, they send an uptake message to the server. For those accepted service proposals the client does not wish to take up, the client may send a declination message from the client terminal to the server. The client uptake or declination message in each case confirms the uptake or declination, respectively, of each accepted service proposal by the respective client.

The server receives the uptake and declination messages (step 116) and records the acceptances and declinations, along with the particular accepting or declining clients.

Each event request may be accompanied be a reply deadline, being the deadline for submission of uptake and declination messages. At the expiry of that deadline, the server may assume that all absent responses are equivalent to respective declination messages.

After receipt of all uptake and declination messages, the server notifies merchants (step 118) of the acceptance or declination of their respective service proposals. For each accepted service proposal, the merchant may also be notified of the number of clients from whom an uptake message for the respective service proposal was received.

Many service proposals, such as a proposal for catering services or discounted accommodation services, will rely on a minimum number of clients accepting the service proposal. Where a client or invitee takes up accepts a service proposal, but later retracts their acceptance, the number of clients who ultimately make use of the service proposal (i.e. attend the event at which a catering service proposal is being fulfilled, or stay at a particular hotel where an accommodation service proposal is being fulfilled) may be lower than the minimum number of clients.

Also, where the service proposal has a maximum number of uptakes or acceptances by clients, the number of clients wishing to take advantage of the service proposal may be higher than the maximum number of uptakes for that service proposal.

The server may queue client uptake messages when the number of client acceptance uptake messages exceeds the maximum number of client uptakes for a particular service proposal (step 120). Thus the server allocates uptake messages to each respective service proposal to which the uptake message relates, until the maximum number of uptake messages has been reached for a particular service proposal. The server then allocates any further client uptake messages (i.e. uptake messages received by the server after the maximum number of uptake messages for a particular proposal has been reached) to a queue. This enables a client to be notified, using the client access details, if a client subsequently retracts acceptance of a particular service proposal, leaving room for one or more additional clients to take up the service proposal.

Service proposals are provided by merchants for particular services the respective merchant can render. Since the service proposals relate to event creation and management, the service proposals are for services such as catering, accommodation, travel (flight, taxi etc), host venue, party supplies and other such event-related services.

Each service proposal may comprise any details necessary for the merchant to provide the services, or provide the services at the cost set out in the service proposal. To that end, each service proposal may comprise a minimum uptake number, a lump sum cost for the service proposal if accepted, a cost per client for the service proposal if accepted, the date or dates on which the service proposal can be fulfilled by the merchant, the lead time required for a merchant to schedule fulfillment of the service proposal, any other relevant information and combinations of such information.

Figure 2:
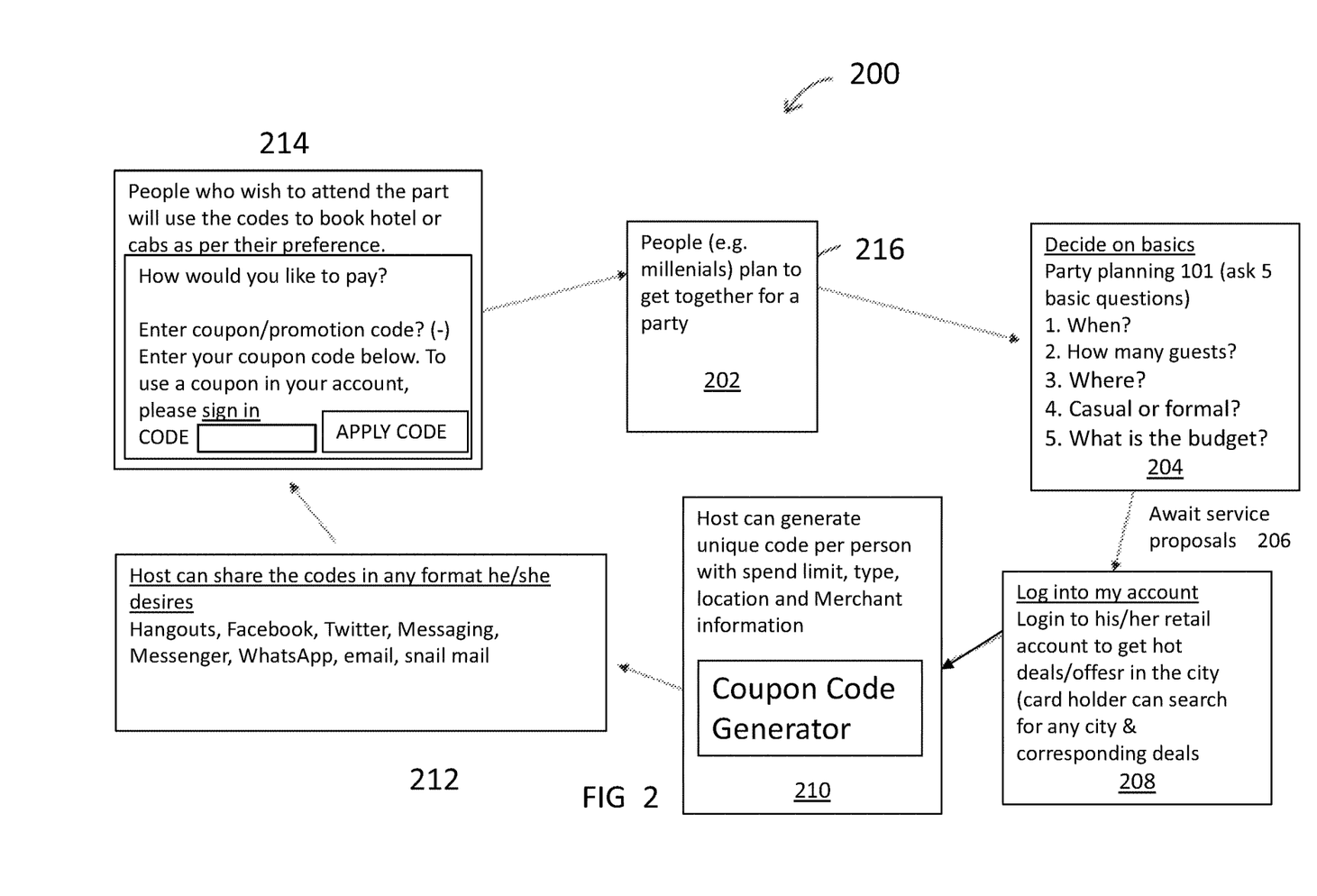
FIG. 2 is an overview of a process flow for using a method according to FIG. 1.

FIG. 2 shows a process flow 200 for using a method according to present teachings and as discussed in relation to FIG. 1. The process flow 200 broadly involves:

Step 202: entering the home screen;
Step 204: entering event constraints;
Step 206: awaiting service proposals;
Step 208: reviewing service proposals;
Step 210: generating coupons;
Step 212: sharing event requests; and
Step 214: redeeming coupons.

In step 202 a host views a homepage 216 on a host terminal. The homepage 216 directs the host to perform various actions in relation to creating and managing an event. After the host elects to create an event (e.g. by clicking on an appropriate button or link), a host request is sent from the host access terminal to a server. The event request may include the type of event being requested—for example, black tie, sporting or casual.

The host request comprises one or more event constraints that at least partially define an event. The event constraints entered at step 204 may comprise a list of all potential event constraints, a list of event constraints customised for the particular type of event (e.g. security for events at which alcohol will be served), a list of essential constraints common to all events, or a combination thereof.

To facilitate collection of constraint information, the server may use a sequence of questions. In the example screenshot shown at step 204 there are five questions:

when—being the date of the event, which may be a single date or a period of, usually consecutive, days;
how many guests—the number of clients or invitees;
where—the venue;
casual or formal—the type of event; and
what is the budget—this is the amount the host is willing to contribute towards the event.

When the host elects to create an event at step 202, the host request may comprise the constraints entered into the screen shown at step 204.

Once the host request has been created the constraints are matched against service proposals in a database. The server may alternatively, or in addition, send a request to one or more merchants seeking service proposals complying with the credentials. It should be noted that a "match", or "compliance", with one or more of the credentials may not be exact. For example, where an event credential is that the number of clients will be 100, the service proposal may provide for minimum attendance of 80 or another figure that is less than 100. The merchant may also provide a service proposal for a greater number of attendees or clients, to show the host what the service proposal would be if the event were made larger.

The host then awaits receipt of service proposals (206), which are selected by the server searching its database of service proposals—searching a database should be taken to include receiving service proposals from merchants in response to a request for a service proposal sent from the server, since any resulting service proposals will be stored in the database.

To periodically check on the progress of service proposals, or to other manage the event, the host may be required to establish an account with the server. This enables the host to log back into the server (208) to view events for which they have sent a host request.

Once the service proposals have been delivered, the host reviews them and selects one or more service proposals. Once the one or more service proposals are selected, the server generates access tokens (e.g. coupons) for sending with event requests to the various clients. The one or more coupons sent with each event request constitute a token for each client or invitee, the use of which is discussed in relation to step 214.

The event requests, or invitations, are shared by any appropriate mechanism. Where the event is open for attendees, the event requests may be shared via open social media channels such as Twitter®. For invitation only events, event requests may be shared by contact methods particular to the individual clients such as via a person-to-person messaging service (e.g. short message service)—step 212.

In some cases, events will comprise positions for a first group of clients (comprising one or more clients) for whom a subsidy is given and a second group of clients (comprising one or more clients) for whom no subsidy is given, or a lower subsidy—the subsidy may be based on the amount the host is willing to contribute towards the event. For example, a host may be willing to contribute $10,000 towards an event to which a first group of 10 clients, and a second group of clients, is expected. Each client in the first group may receive a $1,000 subsidy off the cost of their attendance at the event, and the people in the second group may receive no subsidy. Thus event requests may be sent by a combination of methods so that event requests sent to the first group are only seen by, and accessible from, individual access mechanisms such as personal email or telephone message, and event requests sent to the second group may be publicly accessible.

The token generated for each client may therefore be a single token that is used by each of a plurality of clients—for example, a single token designated for event requests accessible to the second group—and/or an individual token or tokens for a respective individual client or clients.

In addition, one or more event requests may be sent to which no token is attached. This illustrates that a plurality of different event requests may be issued, with a plurality of different tokens, and a plurality of different privileges (e.g. subsidies, service proposal options such as accommodation) attaching to those tokens.

After event requests are sent, with associated access tokens, the clients may access the event request in order to take up or decline attendance at the event and, similarly, take up or decline the various service proposals. The event request may be accessed by any appropriate electronic method, such as opening an email link, selecting various option buttons in an email, replying to a short message service message using a fixed-format response (e.g. by sending the unique access token sent to the particular client, or by quoting the client's name) or opening a webpage and inputting details into the webpage (step 214).

The client may elect to pay for the entirety of their attendance, or may elect to use an access token. Step 214 shows an example of a web interface configured to accept an access token by which a client indicates their uptake of the service proposal or service proposals attaching to that access token.

From this point onwards, the process relies on server interaction per step 116 onwards.

Figure 3:
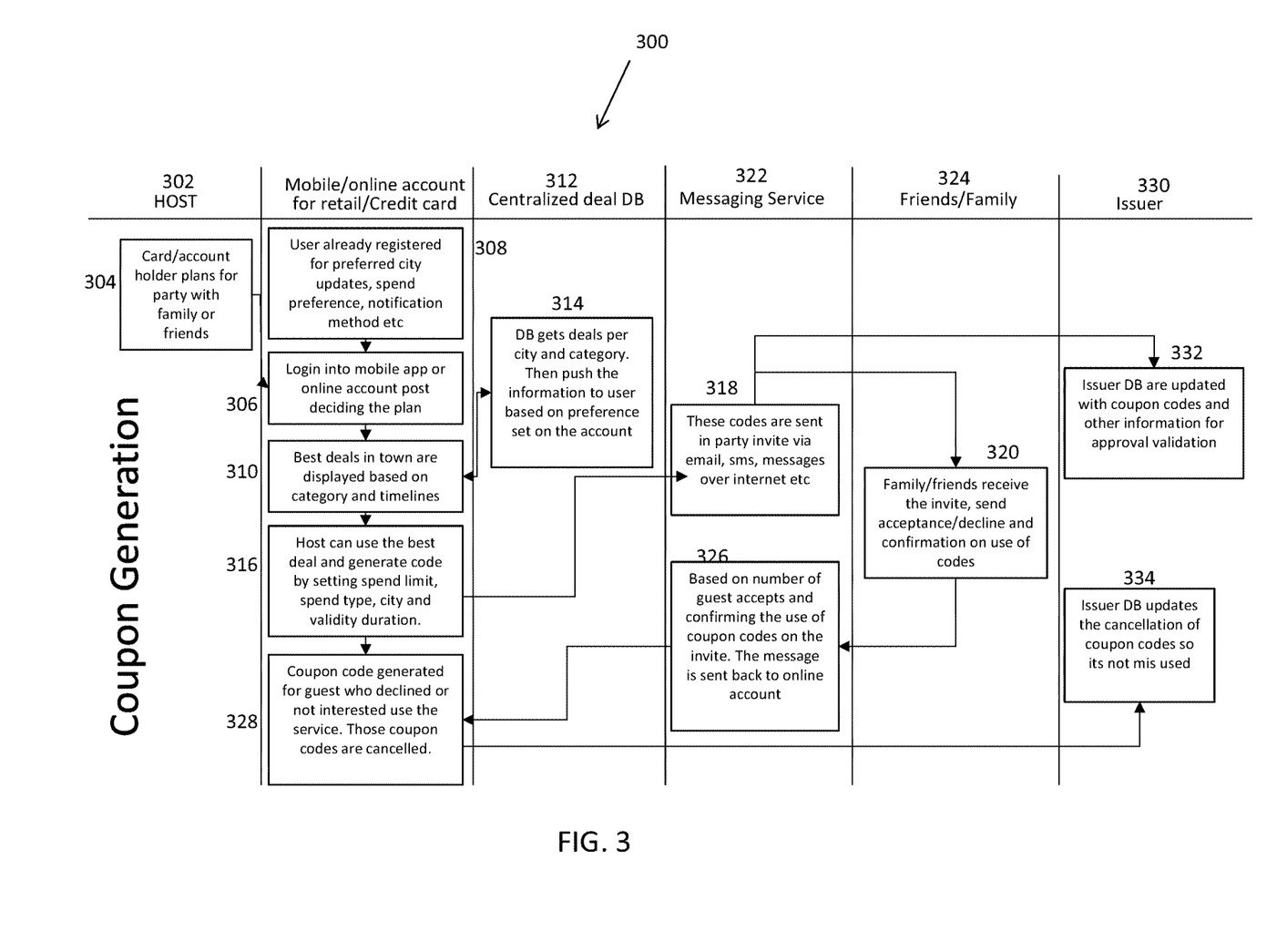
FIG. 3 is a schematic flow diagram for creating an event in accordance with the methods described in relation to FIG. 1.

FIG. 3 is an overview of a process 300 for creating an event in accordance with present teachings. The host 302 elects to host an event such as a party—step 304. The host may be an account holder of a financial account at a particular financial institution. Therefore, electing to host an event and setting a budget may automatically reserve the amount of the budget on a credit card, debit card or in savings associated with the financial account.

The host registers an account with the server for hosting an event, or signs in if already registered with the server—step 306. The sign-in process may automatically load particular settings (e.g. budget, city or other geographical location and notification or event request send methods) where the user has previously registered with the server.

The host may interface with the server used to create events via a web interface, mobile app or other method (309), may sign-in to their account online, or log in via an app—step 308. The app may be the app of the financial institution with which the host holds a financial account, and thus automatically associate any budgeted with funds accessible from that account.

Before or after the host has entered their event credentials, the server displays service proposals to the host for selection when creating the event—step 310. The process of displaying service proposals may involve searching a database (312) of service proposals—step 314—in accordance with step 104 of FIG. 1. The service proposals may be voluntarily uploaded by merchants, or may be solicited by sending details of the events to a list of merchants. The latter case may comprise a tender process whereby merchants tender for provision of the services.

Once service proposals have been displayed to the host, the host selects one or more service proposals (e.g. the best deals in town, or a set of deals offered based on their previous preferences of merchant). The access tokens are then generated using any desired criteria (e.g. a first token for a first client or group of clients, a second token for a second client or group of clients, a single token for multiple clients and so on)—step 316.

The access tokens are then sent in respective event requests via a messaging service (322)—step 318—to clients (324). Where the host is using a credit or debit card to fund the budget for the event, the same access tokens may be sent to the issuer of the card (330) to ensure requisite funds are in the account associated with the card, and to reserve those funds—step 332.

The clients accept or decline the event request and/or particular service proposals, by sending uptake or declination messages respectively to the server—step 320.

Based on the number of uptake and declination messages, the server sends a message to the host account, thereby ensuring funds remain reserved—step 326. Those access tokens that are not used are then cancelled—step 328—to prevent misuse or inadvertent use, particularly where such use is not related to the event. In this circumstance, funds associated with the cancelled access tokens may be released for further use by the host.

When the access tokens are generated, or when the budget is set by the host, the funds required to service the budget may be placed on hold (i.e. barred from usage). The funds are used whenever a client accepts a service proposal, or an event request as a whole, for which those funds were (at least partially) designated. Where the funds exceed the amount designated for the uptake messages that are ultimately received, the funds necessary to cover the services associated with the received uptake messages may be held until delivery of the services (or paid in advance if it is a condition of service by the merchant). The remaining funds may be similarly held until completion of the event, or may be released as soon as all uptake and declination messages have been received.

The server then sends an update message to the issuer (330) advising of the cancellation of the access tokens to which the declination messages relate, so that funds can be released and/or to prevent use of funds associated with the particular access tokens for which declination messages were received—step 334.

Figure 4:
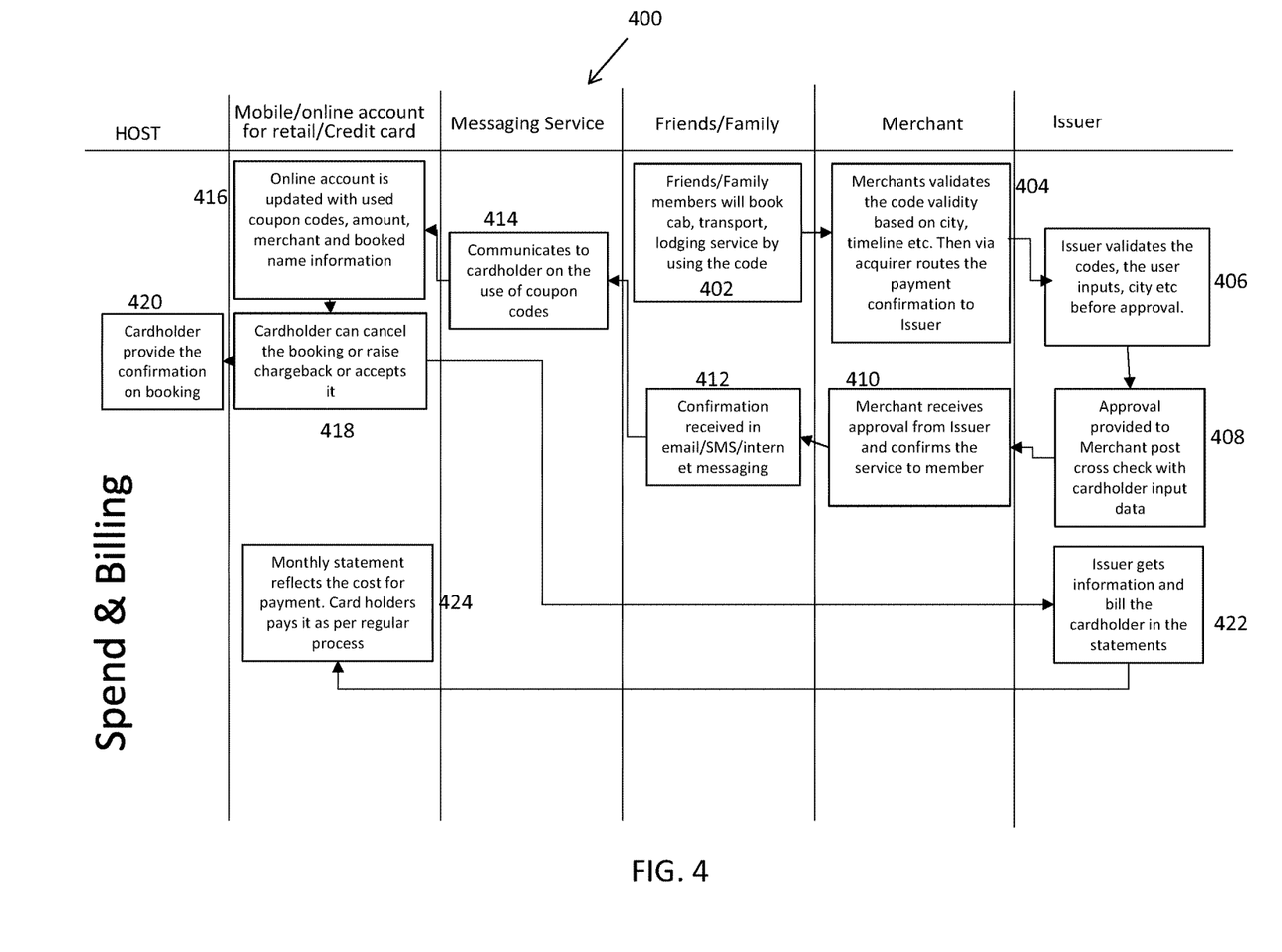
FIG. 4 is a schematic flow diagram for use of an event request generated in accordance with the methods described in relation to FIG. 1.

FIG. 4 is a schematic flow diagram 400 for use of an event request generated in accordance with the methods described in relation to FIG. 1.

Once an event request is received by a client, the client chooses whether to redeem the access token or access tokens accompanying that event request. If they choose to use one or more of the access tokens their choice will result in a booking or reservation for the service or services attaching to the access token or tokens—step 402.

The booking may be made through the event request, such as by clicking on an acceptance or uptake button or opening a link through which to confirm acceptance or uptake of the use of a particular token. Alternatively, the client may make a booking by contacting the merchant the services of whom relate to the access token intended to be used.

The merchant confirms the validity of the access token or code—step 404. In other words the merchant confirms the access token or code is one associated with the provision of their services.

Where a credit or debit card is used by the host to fund the budget for the event, the issuer similarly confirms the validity of the access token—step 406. The issuer thereby ensures the access token is associated with payment vehicle (i.e. card) details of a payment vehicle on which funds have been reserved to pay for the services associated with the access token. If the issuer verifies the access token is valid, the issuer sends an approval message to the merchant that the services can be booked by the client—step 408. The merchant then confirms the booking—step 410—and sends a confirmation message (e.g. email, short message service message) to the client—step 412.

Either the merchant or the issuer also sends a confirmation message to the host to ensure the host is aware of the usage of the various access tokens—step 414. The message to the host may take any desired format and may include information such as a total number of used access tokens for the event, a total number of outstanding access tokens (i.e. access tokens in respect of which no uptake or declination message has been received) and a total cost of servicing the used access tokens.

The host's account, established in accordance with step 308, is updated when an access token is used or a declination message is received—step 416. The host can therefore monitor the progress of uptake and declination of event requests, the use of particular tokens and the use of the budget allocated for the event, using their account.

Whenever a booking is made using a valid access token, it may be automatically accepted. Alternatively, the host may be provided an opportunity to cancel the booking, raise a charge-back (i.e. charge the booking to a particular company or account) or accept the booking—step 418. For example, where a client makes a booking using an access token associated with a particular hotel, and the host changes the accommodation options so that hotel is no longer subsidised, the host may wish to dishonour the access token. The host may therefore wish to cancel the booking.

After all access tokens have been processed (i.e. taken up or declined), the host receives a booking confirmation listing all relevant bookings for which they are liable for partial or full payment—step 420. The issuer similarly receives information on the bookings so that leftover funds can be released and in order to update the account to reflect the usage of funds associated with access tokens for which an uptake message was received—step 422. Similarly, the hosts periodic account statement associated with their payment vehicle will reflect the bookings made with the various merchants, and may also show the access tokens associated with each of the bookings—step 424.

Figure 5:
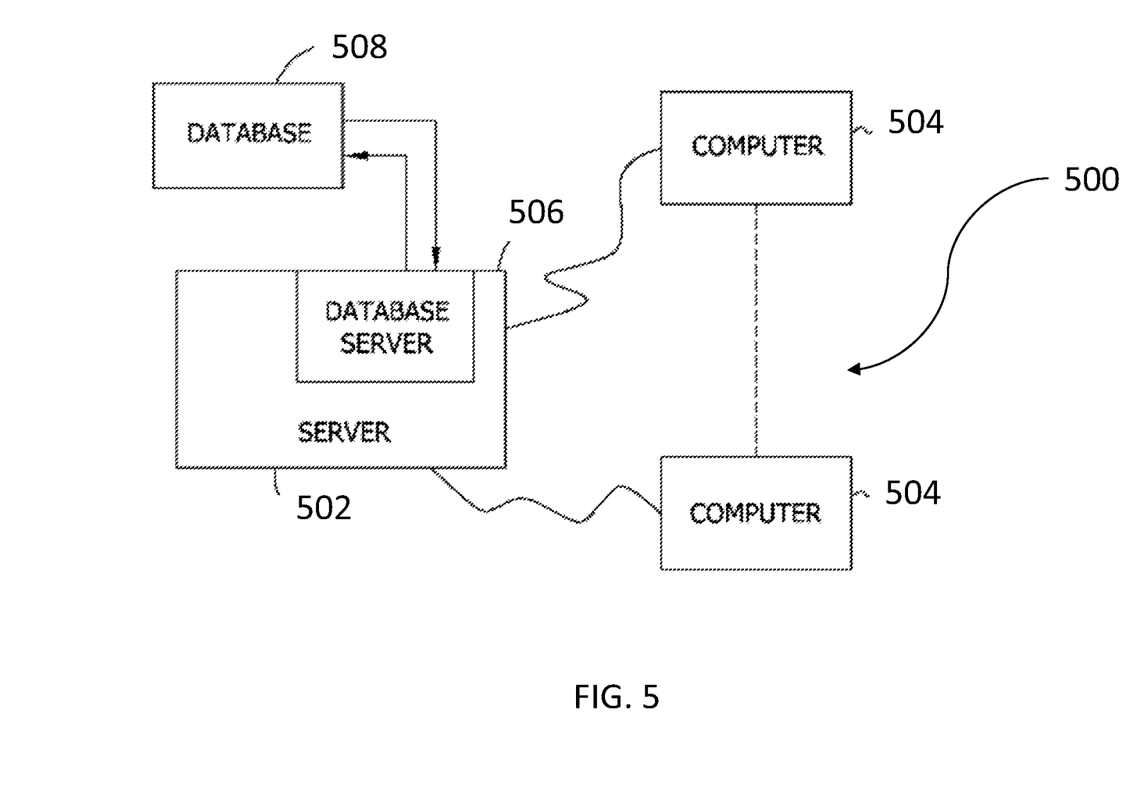
FIG. 5 is a schematic illustration of a network of devices and systems by which to implement the method of FIG. 1.

FIG. 5 is a simplified block diagram of an exemplary network-based system 500 that may be used for managing an event. System 500 is a client/server system that may be utilized for storage and delivery of data. More specifically, in the example embodiment, system 500 includes a server system 502, and at least one client computer system or terminal 504. The server system 502 may comprise the system of a financial institution, payment scheme or services provider for implementing the method of FIG. 1. The client computer system or systems 504 may be the systems of individual merchants in the case of use of the method of FIG. 1, particularly when merchants upload service proposals to the database, or may each be a client or host terminal such as a personal electronic device (e.g. smart phone, tablet, laptop or personal computer) where the method of FIG. 1 is being used to create or manage an event, or to take up or decline services associated with a particular access token or access tokens. Presently the system 500 includes a plurality of client sub-systems, also referred to as client computer systems 504, though this term is also intended to encompass the circumstance where a client computer system 504 is the computer system of the host, connected to server system 502. Client systems 504 may be interconnected to the Internet through a variety of interfaces including a network, such as a local area network (LAN) or a wide area network (WAN), dial-in-connections, cable modems and special high-speed ISDN lines. Client systems 504 could be any device capable of interconnecting to the Internet including a personal computer (PC), a web-based phone, personal digital assistant (PDA), or other web-based connectable equipment.

A database server 506 is connected to database 508, which contains information such as event constraints, used and unused access tokens, used and unused budget and other parameters relating to each event associated with the host's account established in accordance with step 308 and needed for use in the method of FIG. 1. In one embodiment, centralized database 508 is stored on server system 502 and can be accessed by potential users (e.g. hosts via a smartphone, clients via respective client terminals such as smartphones, merchants through merchant terminals such as personal computers) at one of client systems 504 by logging onto server system 502 through one of client systems 504.

In an alternative embodiment, database 508 is stored remotely from server system 502 and may be non-centralized. Database 508 may store electronic files. Electronic files may include transaction data, financial accounts, electronic documents, web pages, other image files and/or electronic data of any format suitable for storage in database 508 and delivery using system 500.

More specifically, database 508 may store host accounts comprising details of created events, event constraints, service proposals, client access details, data on used and pending or unused access tokens and budget information.

The system 500 may be administered by a card issuer or payment scheme, and thus be involved in the provision of financial services over a network, and particularly financial services relating to reserving funds for servicing the budget for an event and in transacting payment for bookings made in relation to the event. In this manner, the system 500 can manage events from the time of creation through to completion (e.g. checkout of accommodation and post-event clean up costs), and monitor and manage payment for service proposals accepted through the system 500. For example, server system 502 could be in communication with an interchange network. The server system 500 may also be able to collect transaction details of transactions made using the present methods and those made using traditional methods, to determine financial and time savings achieved by managing events using the present methods when compared with traditional event management.

Similarly, database 508 may also store financial account data including at least one of a cardholder (i.e. host) name, a cardholder address, an account number, a mobile phone number and other account details. Database 508 may also store merchant data including a merchant identifier that identifies each merchant registered on the network, for the purpose of providing or servicing service proposals, and instructions for settling transactions.

The database 508 may also be a non-transitory computer readable medium storing or embodying a computer program for managing an event. The program may include at least one code segment executable by a computer to instruct the computer to perform a method as described herein, for example with reference to FIG. 1.

Figure 6:
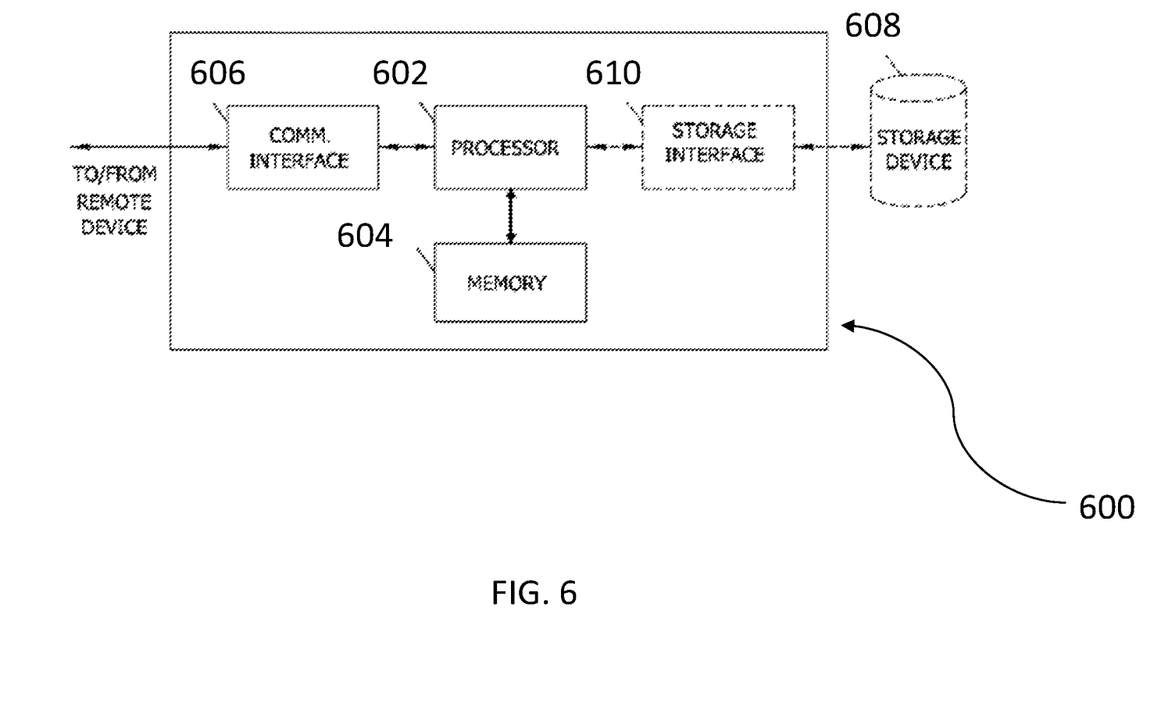
FIG. 6 is a schematic illustration of a computing device for implementing various functions used to perform the method of FIG. 1.

FIG. 6 illustrates an exemplary configuration of a computing device 600, similar to server system 500 (shown in FIG. 5). Computing device 600 may include, but is not limited to, an issuer server, payment scheme server, database server, application server, web server, fax server, directory server, event manager server and mail server.

Server computing device 600 also includes a processor 602 for executing instructions. Instructions may be stored, for example, in a memory area 604 or other computer-readable media. Processor 602 may include one or more processing units (e.g., in a multi-core configuration).

Processor 602 may be operatively coupled to a communication interface 606 such that server computing device 600 is capable of communicating with a remote device such as user computing device 504 (shown in FIG. 5) or another server computing device 600. For example, communication interface 606 may receive host requests, service proposals, uptake, declination and acceptance messages from client system 504 via the Internet.

Processor 602 may also be operatively coupled to storage device 608. Storage device 608 is any computer-operated hardware suitable for storing and/or retrieving data. In some embodiments, storage device 608 is integrated in server computing device 600. For example, server computing device 608 may include one or more hard disk drives as storage device 608. In other embodiments, storage device 608 is external to server computing device 600 and may be accessed by a plurality of server computing devices 600. For example, storage device 608 may include multiple storage units such as hard disks or solid state disks in a redundant array of inexpensive disks (RAID) configuration. Storage device 608 may include a storage area network (SAN) and/or a network attached storage (NAS) system.

In some embodiments, processor 600 is operatively coupled to storage device 608 via a storage interface 610. Storage interface 610 is any component capable of providing processor 602 with access to storage device 608. Storage interface 610 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 602 with access to storage device 608.

In operation, the processor 602, coupled to a memory device (including memory device 604 and storage device 608), is configured to receive a host request through a host access terminal, the host request comprising one or more event constraints that at least partially define an event. The processor is configured to search a database of service proposals to locate at least one service proposal complying with one or more of the event constraints, and transmit the at least one service proposal to the host access terminal.

The processor is further configured to receive at least one service proposal acceptance from the host terminal, each service proposal acceptance being acceptance of a respective one of the at least one service proposal.

Once the acceptance or acceptances are received, the processor can start assembling event requests. To that end, the processor is configured to receive client access details of one or more clients, the client access details designating a means for sending communications from the server to a respective one or more client terminals, generate a token for each client, the token being for accessing one or more accepted service proposals, and transmit an event request to each of the one or more client terminals, each event request comprising the token.

The processor may be configured to receive a host request by receiving a request for creation of the event. In this case, each constraint is one from the group of: a date for the event; a number of invitees; a budget for the event; a location for the event; a type for the event. The location constraint may comprise one of a geographical region, a city or town, and a specific location with or without a location tolerance radius. The location constraint allows service proposals to be filtered according to whether they are service proposal for services at the location or outside of the location.

The processor may further be configured to receive, from each of a plurality of merchant terminals, one or more service proposals for populating the database. These are the service proposals that are subsequently searched for compliance with the event constraints. Alternatively, the service proposals may be solicited in response to receipt of event constraints, so that the service proposals are known to be compliant with the event constraints. Populating the database may comprise categorising respective service proposals into at least one of: accommodation, transport, food and beverage, entertainment, equipment hire (e.g. golf clubs, skis, other sporting equipment, camera equipment, hobbyist supplies etc) and clothing hire, and the processor may be configured to perform that categorisation.

Each service proposal may comprise a minimum uptake number, the processor thus being configured to search the database of service proposals by filtering service proposals according to whether the respective minimum uptake number is equal to or less than the number of clients or an expected number of clients which may be less than the total number of clients to whom event requests will ultimately be sent by the server.

The processor may be configured to receive client access details by receiving, for each client, at least one of an email address, a mobile phone number and a communications app username by which communications can be sent from the server to a respective one or more client terminals.

The processor may be further configured to receive, from each client terminal, a client uptake or declination message confirming the uptake or declination, respectively, of each accepted service proposal by the respective client, and each such uptake or declination message may be accompanied by the token generated for the respective client.

The processor may further be configured to notify the merchant associated with each accepted service proposal of the uptake or declination of the accepted service proposal by the respective client. In this regard, the processor may also be configured to queue uptake messages received after the maximum number of uptake messages is reached.

The computer system 600 may be instructed by a computer program embodied on a non-transitory computer readable medium, such as memory device 604 or storage device 608. The program stored on the device 604, 608 would include at least one code segment, and most likely many thousands of code segments, executable by a computer to instruct the computer to perform the requested operations.

Similarly, the program may be stored remotely. To this end, the computer system may constitute a client computer system of a network-based system for performing the above methods.

Many modifications and variations of the present teachings will be apparent to the skilled person in light of the present disclosure. All such modifications and variations are intended to fall within the scope of the present disclosure. Moreover, to the extent possible, features form one of the embodiments described herein may be used in one or more other embodiments to enhance or replace a feature of the one or more other embodiments. All such usage, substitution and replacement is intended to fall within the scope of the present disclosure.

The invention claimed is:

1. A computer-implemented method for managing events, comprising:
   receiving a host request through a host access terminal, the host request comprising one or more event constraints that at least partially define an event;
   searching a database of service proposals to locate at least one service proposal complying with one or more of the event constraints;
   transmitting the compliant service proposals to the host access terminal;
   receiving a plurality of service proposal acceptances from the host terminal, each service proposal acceptance being acceptance of a respective one of the compliant service proposals;
   receiving client access details of one or more third-party clients, the client access details designating a means for sending communications from a server to a respective one or more client terminals associated with the third-party clients;
   generating a token for each third-party client, the token being for accessing one or more accepted service proposals, the tokens being customized for the third-party clients to include details of the service proposal acceptances intended for the respective third-party clients, at least a portion of the customized tokens being distinct from one another;

storing the details of the service proposal acceptances intended for the third-party clients;

transmitting an event request to each of the one or more client terminals, each event request comprising the token generated for the associated third-party client, wherein the tokens each include metadata linking the tokens with the respective service proposal acceptances; and, receiving, from each of the one or more client terminals, a client uptake or declination message confirming the uptake or declination, respectively, of each of the service proposal acceptances by the associated third-party clients, wherein each of the uptake or declination messages is accompanied by the token generated for the associated third-party client, and, wherein the uptake or declination messages are associated with the respective service proposal acceptances utilizing the metadata of the tokens.

2. A computer-implemented method according to claim 1, further comprising receiving, from each of a plurality of merchant terminals, one or more of the service proposals for populating the database.

3. A computer-implemented method according to claim 2, wherein populating the database comprises categorizing the respective service proposals into at least one of: accommodation, transport, food and beverage, entertainment, equipment hire and clothing hire.

4. A computer-implemented method according claim 1, wherein receiving a host request comprises receiving a request for creation of the event, and each of the event constraints is selected from a group consisting of: a date for the event; a number of invitees; a budget for the event; a location for the event; a type for the event.

5. A computer-implemented method according to claim 4, wherein the location for the event comprises one of a geographical region, a city or town, and a specific location with or without a location tolerance radius.

6. A computer-implemented method according to claim 4, wherein the searching the database of the service proposals comprises filtering the service proposals according to whether the service proposals are for services available at the location for the event.

7. A computer-implemented method according to claim 1, wherein each of the service proposals comprises a minimum uptake number, and the searching the database of the service proposals comprises filtering the service proposals according to whether the respective minimum uptake number is equal to or less than the number of invitees.

8. A computer-implemented method according to claim 1, wherein the receiving the client access details comprises receiving at least one of an email address, a mobile phone number and a communications app username by which communications can be sent from the server to the respective one or more client terminals.

9. A computer-implemented method according to claim 1, further comprising notifying the merchant of each of the service proposal acceptances of the uptake or declination of the service proposal acceptances by the associated third-party clients.

10. A computer-implemented method according to claim 1, wherein at least one of the third-party clients comprises a group having multiple members, the method further comprising associating a maximum uptake with the corresponding event request, the maximum uptake being a maximum number of uptake messages receivable from the group.

11. A computer-implemented method according to claim 10, further comprising queuing uptake messages received after the maximum number of uptake messages is reached.

12. A computer system for managing events, the computer system comprising:

a memory device for storing data;

a display; and a processor coupled to the memory device and being configured to:

receive a host request through a host access terminal, the host request comprising one or more event constraints that at least partially define an event;

search a database of service proposals to locate at least one service proposal complying with one or more of the event constraints;

transmit the compliant service proposals to the host access terminal;

receive a plurality of service proposal acceptances from the host terminal, each service proposal acceptance being acceptance of a respective one of the compliant service proposals;

receive client access details of one or more third-party clients, the client access details designating a means for sending communications from a server to a respective one or more client terminals associated with the third-party clients;

generate a token for each third-party client, the token being for accessing one or more accepted service proposals, the tokens being customized for the third-party clients to include details of the service proposal acceptances intended for the respective third-party clients, at least a portion of the customized tokens being distinct from one another;

store the details of the service proposal acceptances intended for the third-party clients;

transmit an event request to each of the one or more client terminals, each event request comprising the token generated for the associated third-party client, wherein the tokens each include metadata linking the tokens with the respective service proposal acceptances; and, receive, from each of the one or more client terminals, a client uptake or declination message confirming the uptake or declination, respectively, of each of the service proposal acceptances by the associated third-party clients, wherein each of the uptake or declination messages is accompanied by the token generated for the associated third-party client, and, wherein the uptake or declination messages are associated with the respective service proposal acceptances utilizing the metadata of the tokens.

13. A computer system according to claim 12, wherein the processor is further configured to receive, from each of a plurality of merchant terminals, one or more of the service proposals for populating the database.

14. A computer system according to claim 13, where the processor is configured to populate the database by categorizing the respective service proposals into at least one of: accommodation, transport, food and beverage, entertainment, equipment hire and clothing hire.

15. A computer system according to claim 12, wherein the processor is configured to receive a host request by receiving a request for creation of the event, and each of the event constraints is selected from a group consisting of: a date for the event; a number of invitees; a budget for the event; a location for the event; a type for the event.

16. A computer system according to claim 15, wherein the location for the event comprises one of a geographical region, a city or town, and a specific location with or without a location tolerance radius.

17. A computer system according to claim 15, wherein the processor is configured to search the database of the service proposals by filtering the service proposals according to whether the service proposals are for services available at the location for the event.

18. A computer system according to claim 15, wherein each of the service proposals comprises a minimum uptake number, and the processor is configured to search the database of the service proposals by filtering the service proposals according to whether the respective minimum uptake number is equal to or less than the number of invitees.

* * * * *